Figure 1:
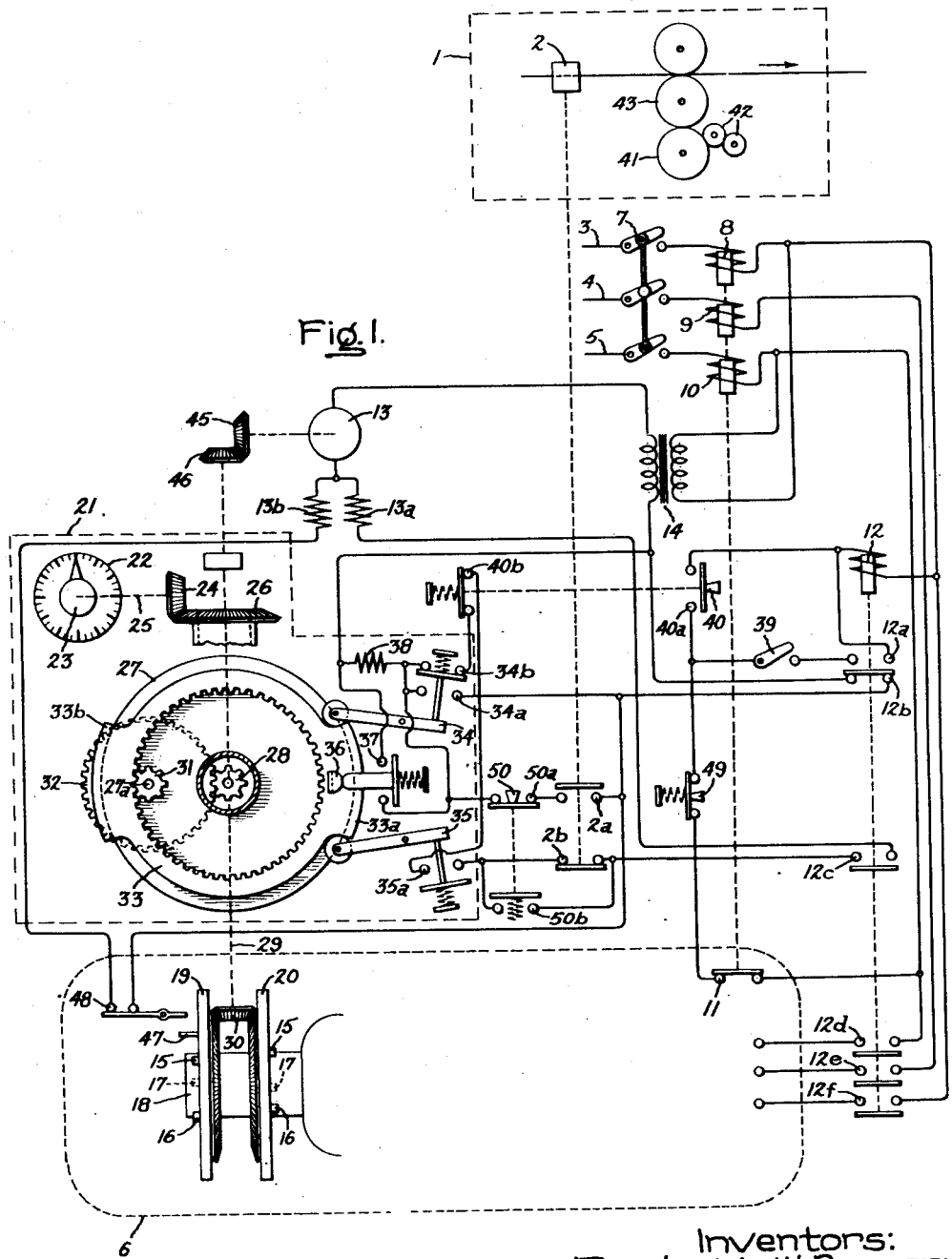

July 24, 1951   F. W. BAUMANN ET AL   2,561,837
PRESET SPEED DEVICE FOR ADJUSTABLE SPEED MOTORS
Filed Aug. 22, 1950   2 Sheets-Sheet 2

Inventors:
Frederick W. Baumann,
Kinloch P. Grenfell,
by Ernest F. Britton
Their Attorney.

Patented July 24, 1951

2,561,837

UNITED STATES PATENT OFFICE 2,561,837

PRESET SPEED DEVICE FOR ADJUSTABLE SPEED MOTORS

Frederick W. Baumann and Kinloch P. Grenfell, Schenectady, N. Y., assignors to General Electric Company, a corporation of New York Application August 22, 1950, Serial No. 180,816

3 Claims. (Cl. 318—214)

Our invention relates to speed control devices and, more particularly, to preset speed control devices for brush-shifting motors such as shown in Reissue Patent 14,031—Schrage.

The operating speed desired in small Schrage motors can be preset by simply setting the brushes at a suitable position. Then, when the motor is energized, it comes up to the preset operating speed with no further adjustments. However, in the case of the larger adjustable speed motors, such as those having ratings above 5 h. p., the starting currents are of such magnitude that such a simple starting procedure is not possible. Our invention, therefore, finds particular application with A.-C. brush shifting type motors having a shunt characteristic and having an output of 5 h. p. or more. Such machines can be brought up to a preset speed by several methods. One such method is by inserting resistance in the secondary circuit. Another method is starting the motor with the brushes in the low speed position and, after starting, manually adjusting the brushes to bring the motor to the desired speed.

When a wound rotor induction motor is brought up to speed by changing the physical resistance of the secondary circuits, timed contactors can be used to bring the motor up to the desired operating speed automatically, but this requires bulky, expensive equipment. On the other hand changing the brush position is a manual operation, and it requires the presence of an operator to move the brushes for starting the motor and to return the brushes to the low speed position when the motor is stopped.

Therefore, an important object of our invention is to provide improved means for presetting the operating speed of an A.-C. brush shifting motor so that the motor is automatically brought up to the preset speed when energized.

Another object of our invention is to provide improved means for presetting and adjusting the speed of A.-C. brush shifting motors.

In carrying out our invention in one embodiment thereof, a planetary differential gear mechanism cooperating with a pair of limit switches is used to convert a setting on a speed presetting dial into switching operations to control the operation of a pilot motor. The pilot motor changes the position of the brushes in the motor.

While our invention will be described as applied to A.-C. brush shifting motors used as drive means for an offset type printing press, it is to be understood that it is not limited to such application, as the disclosure in this respect is merely illustrative for purposes of explaining the inventive concept.

Figure 2:
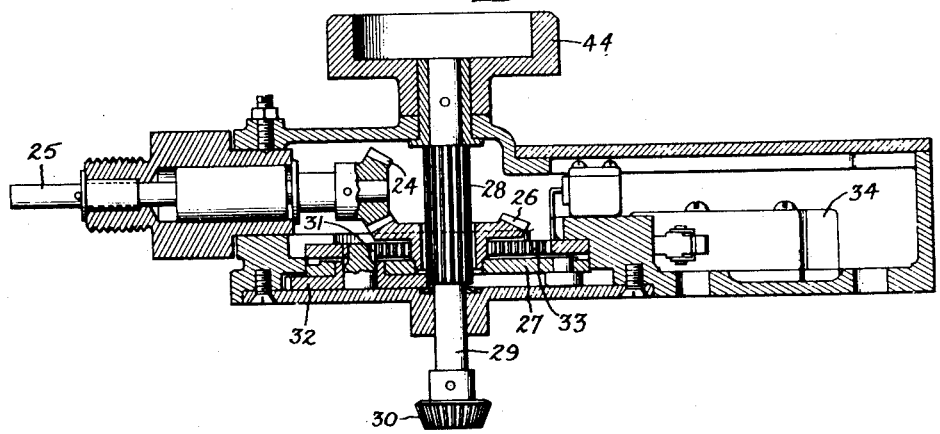
Figure 3:
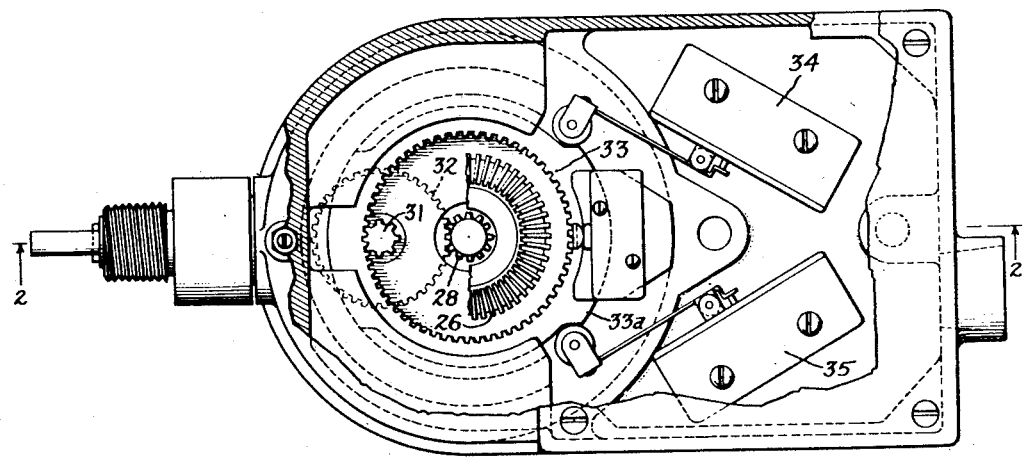

For additional objects and advantages and for a better understanding of our invention, attention is now directed to the following description and the accompanying drawing and also to the appended claims in which the features of our invention believed to be novel are particularly pointed out. Fig. 1 is a schematic diagram of the control circuit of an offset printing press embodying our invention; Fig. 2 is a sectional view in elevation of our invention taken on the line 2—2 of Fig. 3; and Fig. 3 is a plan view of our invention partly in section.

Referring to the drawings an offset type printing press 1 having paper passing therethrough from left to right is provided with a caliper type trip device 2 for slowing the printing press to ⅓ of its normal operating speed in the event of a paper jam or when the paper supply is exhausted. The supply conductors 3, 4 and 5 supply 3 phase power to the A.-C. brush shifting type motor 6, having a shunt characteristic. A switching device such as the circuit breaker 7 is provided to connect the motor 6 to the aforementioned supply conductors.

Motor 6 is protected against overloading by the overcurrent relays 8, 9 and 10 which control the contacts 11. Contacts 11 are in series in the energizing circuit of relay 12. When contacts 11 are opened, relay 12 is de-energized and the normally open contacts 12d, 12e, and 12f are opened.

A pilot motor such as the reversible motor 13 is provided to move the brush yokes of motor 6. Motor 13 is energized through a circuit connected across two of the phases of the 3 phase supply and including the transformer 14. The field winding 13a of motor 13 is energized for forward operation and the field winding 13b is energized for reverse operation. In forward operation the speed of motor 6 is increased and in reverse operation, the speed of motor 6 is decreased. The pairs of brushes 15, 16, and 17 of motor 6 are mounted radially about the commutator 18 on the brush yokes 19 and 20. Yokes 19 and 20 are each secured to a different bevel gear and are concentric about commutator 18. Yokes 19 and 20 are rotated in opposite direction about commutator 18 in response to rotation of pilot motor 13. The relative position of the brushes in any one pair governs the speed of motor 6.

The speed presetting mechanism 21 translates a preset speed from the dial 22 into a switching operation for controlling the direction of rotation of pilot motor 13. The knob 23 is secured to the bevel gear 24 through a shaft 25. Gear 24 meshes with the bevel gear 26 which is secured to the disk 27.

A planetary differential gear mechanism whose sun gear 28 is integral with the shaft 29 connects the pilot motor 13 to the bevel gear 30 which drives brush yokes 19 and 20. The planet gears 31 and 32 are secured to pin 27a which is rotatably mounted on the face of disk 27. Planet 31 is engaged with the internal gear 33, and planet gear 32 meshes with gear 28.

Cam 33a on the circumference of internal gear 33 is provided to operate the limit switches 34 and 35 in response to the rotation of internal gear 33. Cam 33a is shaped so that when it lies in the neutral position shown in Fig. 1 neither of the limit switches is operated and pilot motor 13 remains de-energized. However, rotation of internal gear 33 in either direction will cause one of the limit switches to be operated, thereby energizing pilot motor 13 for rotation in the direction corresponding to the change of speed dictated by the rotation of knob 23. Internal gear 33 rests on cam 33a and a projection 33b diametrically opposite cam 33a. Cam 33a and projection 33b are supported in a suitable trackway provided in the housing of preset speed mechanism 21.

A finger 36 is mounted on cam 33a to open contacts 37 thereby inserting the resistor 38 in series in the pilot motor circuit with pilot motor 13. This reduces the speed of motor 13 as it is driving cam 33a back to the neutral position, thus preventing overriding of the neutral position and consequent hunting.

During operation, an offset plate is secured to the roller 41 and inked through the rollers 42. As roller 41 is turned, the image from the offset plate is transferred to roller 43 and from there on to the paper. When the offset plate is mounted on roller 41, it is desired that roller 41 be rotated through small consecutive angles as desired by the operator while mounting the plate. To accomplish this a switch 39 is connected in series with the holding contacts 12a of relay 12. Motor 6 can then be jogged by simply pressing the start button 40. Holding contacts 12a are not in the circuit; so as soon as roller 41 has been turned through the desired angle, start button 40 is released thereby de-energizing relay 12 and motor 6. When switch 39 is closed, holding contacts 12a are in the circuit and relay 12 is held energized after start button 40 has been pressed and released.

After the offset plate is mounted on roller 41 and circuit breaker 7 is closed, the operator starts motor 6 by closing switch 39 and pressing start button 40. This energizes relay 12 closing the normally open contacts 12a, 12c, 12d, 12e, and 12f. The normally closed contacts 12b are opened. When start button 40 is released, contacts 40a are opened but relay 12 is held energized through switch 39 and holding contacts 12a. If it is assumed that the brushes are in the low speed position, motor 6 now comes up to this low speed.

In order to increase the speed of motor 6, the operator simply adjusts knob 23 to the desired speed as indicated on dial 22. This adjustment could easily have been made before motor 6 was energized. If it had been made, motor 6 would have been brought automatically to the desired speed from the low speed by the operation of the preset speed control mechanism as hereinafter described.

When knob 23 is rotated, disk 27 is also driven through a corresponding angle through shaft 25, bevel gear 24, and bevel gear 26. Sun gear 28 is connected to pilot motor 13 through shaft 29, coupling 44, and a gear train such as the beveled gears 45 and 46. Sun gear 28 is held stationary by the friction forces in bevel gears 45 and 46 and in pilot motor 13. Therefore, as disk 27 is rotated, planet gear 32 is driven in rotation about the axis of pin 27a, and drives planet gear 31 in rotation through pin 27a. The rotation of planet gear 31 about the axis of pin 27a drives internal gear 33 in rotation. If the rotation of internal gear 33 is in a clockwise direction, the consequent movement of cam 33a closes contacts 35a, thereby connecting field winding 13a in the pilot motor circuit. This connection causes pilot motor 13 to drive the brushes in the respective pairs on motor 6 to raise the speed of rotation of motor 6.

Sun gear 28 and bevel gear 30 are mounted on the same shaft. Therefore, as bevel gear 30 is turned to move the brushes, sun gear 28 is turned through the same angle and drives planet gear 32 in rotation about pin 27a. Planet gear 32 now drives planet gear 31 through pin 27a, and planet gear 31, in turn, drives internal gear 33 to return it to a neutral position. As cam 33a is brought back to the neutral position, finger 36 opens contacts 37, thereby inserting resistor 38 in series with pilot motor 13. When cam 33a reaches the neutral position, contacts 35a are opened and pilot motor 13 is de-energized. Motor 6 is now turning at the desired operating speed.

In the event of a paper jam or in the event that the paper supply is exhausted caliper tripping device 2 detects the change in the predetermined thickness of paper passing therethrough and closes contacts 2a and opens contacts 2b. This action connects winding 13b in the pilot motor circuit causing pilot motor 13 to drive the brushes back down to the low speed position which usually corresponds to one-third of the operating speed. When the brushes reach the low speed position, the finger 47 on yoke 19 opens contacts 48 thereby de-energizing pilot motor 13. When pilot motor 13 moved the brushes to the low speed position, it also drove internal gear 33 clockwise out of the neutral position.

After the operator has cleared the paper jam, the caliper trip device 2 must be reset manually thereby opening contacts 2a and closing contacts 2b. This automatically energizes pilot motor 13 through windings 13a, and pilot motor 13 changes the brush position to bring motor 6 up to the high speed operating point as hereinbefore described.

If the operator wishes to reduce the speed of motor 6 while the press is in operation, he simply changes the setting of knob 23 thereby rotating internal gear 33 in a counterclockwise direction. Contacts 34a are closed and contacts 34b are opened. Field winding 13b is energized and pilot motor 13 moves the brushes to the new position. When the brushes reach the new position cam 33 is once more in the neutral position and contacts 34a are opened and contacts 34b are closed, thereby de-energizing pilot motor 13.

When the operator desires to stop the press, he simply pushes stop button 49. This de-energizes relay 12 thereby opening the holding contacts 12a and the contacts 12d, 12e, and 12f in series with the supply conductors of motor 6. Motor 6 is now de-energized and wind and friction forces bring it to a halt. Winding 13b is connected in the pilot motor circuit through the contacts 12b thereby causing pilot motor 13 to drive the brush yokes to the low speed position. Cam 33a is driven in a clockwise direction at the same time so that contacts 35a are closed. Now, unless the position of knob 23 is changed, the next time that the press is started pilot motor 13 is connected to bring motor 6 up to the previous operating speed as hereinbefore described.

The rollers of the printing press must be cleaned periodically, and at such times it is desired that the press be operated at full speed with no paper going through. To accomplish this, the operator first sets knob 23 to the full speed position. The press is started as hereinbefore described except that in addition the push button 50 must be held depressed thereby opening contacts 50a and closing contacts 50b. This bypasses the contacts of caliper trip device 2 and connects windings 13a in the pilot motor circuit to cause the pilot motor to bring induction motor 6 up to the high speed. As soon as button 50 is released, contacts 50a are closed, contacts 50b are opened, and the contacts of caliper trip device 2 take over to bring the motor 6 to the low speed point of operation as hereinbefore described.

It will be noted that in all the operations hereinbefore described, whenever one of the field windings of pilot motor 13 is energized, simultaneously operated contacts open the circuit of the other field winding so that both windings 13a and 13b cannot be energized at the same time. It will also be noted that when switch 39 is open and start button 40 is depressed to jog motor 6, contacts 40b in series with winding 13a are opened thus preventing pilot motor 13 from changing the brush position and increasing the speed of motor 6.

While our invention has been described by reference to particular embodiments thereof, it will be understood that this is by way of illustration of the principles involved and that those skilled in the art may make many modifications in the arrangement and mode of operation. Therefore, we contemplate by the appended claims to cover any such modifications as fall within the true spirit and scope of our invention.

What we claim as new and desire to secure by Letters Patent of the United States is:

1. For an adjustable speed alternating current brush shifting motor having movable brush yokes for shifting the brushes to adjust the speed thereof, a mechanism for automatically moving said brush yokes to operate said motor at a preset speed in response to the energizing of said motor, said preset speed mechanism comprising a shaft, a control knob mounted on said shaft for manually positioning said shaft, an internal gear having a cam on a portion secured to the periphery thereof, a reversible pilot motor for driving said brush yokes, gear means including a planetary differential gear mechanism driven by said pilot motor and by the manual rotation of said shaft for driving said internal gear in rotation, circuits for energizing said reversible pilot motor, limit switches each operated in response to the rotation of said internal gear cam in a different direction and having contacts in series in said pilot motor energizing circuits for controlling the direction of rotation of said pilot motor, a circuit for energizing said brush shifting motor, a contactor for energizing and de-energizing said brush shifting motor and having normally open contacts in series in said brush shifting motor energizing circuit and having normally open contacts in series in said pilot motor energizing circuits, a circuit for energizing said contactor, a start switch having normally open contacts in series in said contactor energizing circuit, said contactor having normally open holding contacts connected in parallel relation with said start switch, a stop switch having normally closed contacts in series in said contactor energizing circuit, said contactor having normally closed contacts for bypassing said limit switches for connecting said pilot motor for moving said brush yokes to a low speed position in response to the de-energization of said contactor.

2. For an adjustable speed alternating current brush shifting motor having movable brush yokes for shifting the brushes to adjust the speed thereof, a mechanism for automatically moving said brush yokes to operate said brush shifting motor at a preset speed in response to the energizing of said brush shifting motor, said preset speed mechanism comprising a housing, a shaft rotatably mounted in said housing, a control knob mounted on said shaft for manually positioning said shaft, an internal gear having a cam on a portion of the periphery thereof, a reversible pilot motor for driving said brush yokes, gear means including a planetary differential gear mechanism driven by said pilot motor and by the manual rotation of said shaft for driving said internal gear in rotation, circuits for energizing said reversible pilot motor, limit switches each operated in response to the rotation of said internal gear cam in a different direction and having contacts in series in said pilot motor energizing circuits for controlling the direction of rotation of said pilot motor, a circuit for energizing said brush shifting motor, a contactor for energizing and de-energizing said brush shifting motor and having normally open contacts in series in said brush shifting motor energizing circuit and having normally open contacts in series in said pilot motor energizing circuits, a circuit for energizing said contactor, a start switch having normally open contacts in series in said contactor energizing circuit, said contactor having normally open holding contacts in parallel relation with said start switch, a stop switch having normally closed contact in series in said contactor energizing circuit, said contactor having normally closed contacts for bypassing said limit switches for connecting said pilot motor for moving said brushes to a low speed position in response to the de-energization of said contactor, a jog switch having normally closed contacts in series relation with said holding contacts for controlling the operation of said start switch for jogging or for running said brush shifting motor, an overload relay responsive to currents above a predetermined level connected in series in said brush shifting motor circuit and having normally closed contacts in series in said contactor circuit, a speed-reducing switch having normally closed contacts in series in said pilot motor energizing circuits, a resistor connected in parallel relation with said last mentioned contacts, and a trip arm secured to said cam for operating said speed-reducing switch in response to the approach of said cam to the neutral position between said limit switches.

3. For an adjustable speed alternating current brush shifting motor having movable brush yokes for shifting the brushes to adjust the speed thereof, a mechanism for automatically moving said brush yokes for operating said brush shifting motor at a preset speed in response to the energizing of said brush shifting motor, said preset speed mechanism comprising a housing, a shaft rotatably mounted within said housing, a control knob mounted on said shaft for manually positioning said shaft, an internal gear having a cam on a portion of the periphery thereof, a reversible pilot motor for driving said brush yokes, a gear train connecting said pilot motor and said brush yokes, a disk rotatably mounted in said housing, a planetary differential gear mechanism having two planet gears pivotally mounted on the face of said disk and having a sun gear driven in rotation by said pilot motor through said gear train, said sun gear meshed with a first one of said planet gears, said internal gear meshed with a second one of said planet gears, a first bevel gear secured to one end of said shaft, a second bevel gear meshed with said first bevel gear and secured to said disk, circuits for energizing said reversible pilot motor, limit switches each operated in response to a different direction of rotation of said internal gear cam and having contacts in series in said pilot motor energizing circuits for controlling the direction of rotation of said pilot motor, a circuit for energizing said brush shifting motor, a contactor having normally open contacts in series in said brush shifting motor energizing circuit and having normally open contacts in series in said pilot motor energizing circuits, a circuit for energizing said contactor, a start switch having normally open contacts in series in said contactor energizing circuit, said contactor having normally open holding contacts in parallel relation with said start switch, a stop switch having normally closed contacts in series in said contactor energizing circuit, said contactor having normally closed contacts for bypassing said limit switches for connecting said pilot motor for moving said brushes to a low speed position in response to the de-energization of said contactor, a jog switch having normally closed contacts in series with said holding contacts for controlling the operation of said start switch for jogging or for running said brush shifting motor, an overload relay responsive to currents above a predetermined level connected in series in said brush shifting motor circuit and having normally closed contacts in series in said contactor circuit, a speed-reducing switch having normally closed contacts in series in said pilot motor circuit, a resistor connected in parallel relation with said last-mentioned contacts, and a trip arm secured to said cam for operating said speed-reducing switch in response to the approach of said cam to the neutral position between said limit switches.

FREDERICK W. BAUMANN.
KINLOCH P. GRENFELL.

No references cited.